Feb. 25, 1941.　　　F. J. BETTER　　　2,232,687
BRAKE MECHANISM
Filed Nov. 6, 1939
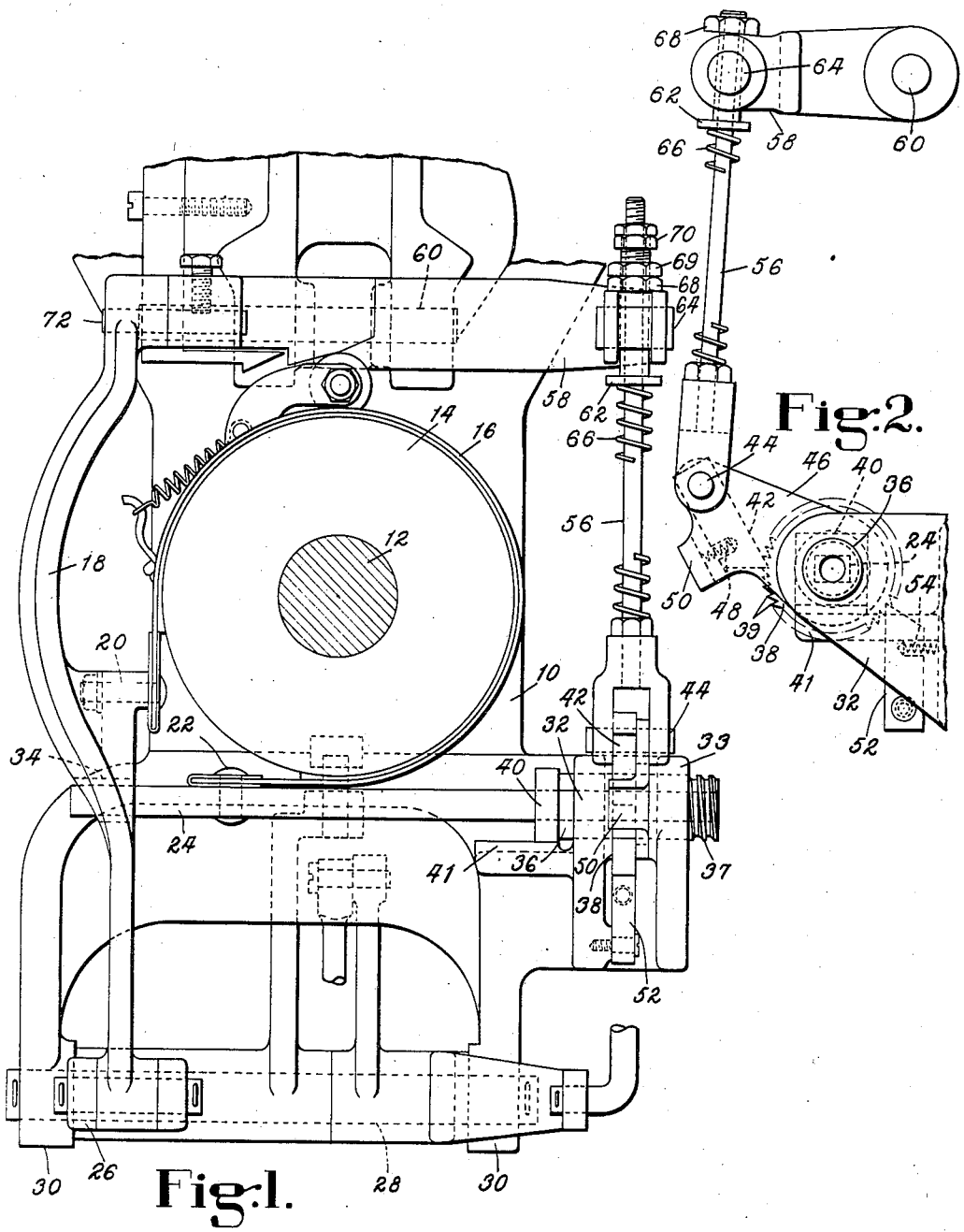

Patented Feb. 25, 1941

2,232,687

UNITED STATES PATENT OFFICE 2,232,687

BRAKE MECHANISM

Francis J. Better, Beverly, Mass., assignor to United Shoe Machinery Corporation, Borough of Flemington, N. J.

Application November 6, 1939, Serial No. 302,978

6 Claims. (Cl. 188—79.5)

This invention relates to braking mechanism and is herein disclosed as embodied in a press of the type illustrated in United States Letters Patent No. 921,503, granted May 11, 1909, upon an application filed in the name of Arthur Bates.

Presses of the type aforementioned comprise a die-striking member carried by a spindle which is reciprocated in a heightwise direction by an eccentric on a drive shaft connected to a source of power by a clutch, there being a band brake operative to bring the shaft to rest with the striking member in raised position after a single operation of the member. It sometimes happens that when the brake becomes worn it is no longer operative to bring the shaft to rest but will permit it to overrun causing the presser member to repeat its operation, thereby increasing the hazard of injury to an operator or of damage to work in the machine.

It is an object of the present invention to obviate the difficulty above mentioned by providing mechanism for maintaining the effectiveness of the brake, so that even though it becomes worn it will continue to stop the drive shaft in predetermined position. To this end, and as illustrated, I have provided, in a machine of the type referred to, mechanism, actuated during each cycle of operation of the machine before the braking force is fully applied, to cause a preliminary tightening of a brake band about a brake drum to take up the slack in the brake band, thereby ensuring uniform operation of the brake even though the brake band becomes worn or stretched.

These and other features of the invention will be apparent from the following detailed specification when taken in connection with the accompanying drawing and are pointed out in the claims.

In the drawing,

Fig. 1 is a view in end elevation of a portion of a press machine embodying my invention; and Fig. 2 is a view in side elevation of the brake band tightening mechanism.

The machine shown in Fig. 1 comprises a frame 10 having a drive shaft 12 carrying a brake drum 14, there being a brake band or strap 16 passing about the drum, and having its normally slack end connected to a brake lever 18 by means of a pin 20. The normally fixed or anchored end of the strap is secured by a rivet 22 to a rod 24. The brake lever 18 is operated at a desired point in the cycle of operation of the machine by a lever 26 which is mounted upon a shaft 28 carried by ears 30 depending from the frame 10. As is common in machines of this type, the lever 26 is operated at the end of a single revolution of the shaft 12 to cause downward movement of the lever 18, tightening the strap 16 about the drum 14 to apply the brake. The construction and operation of the mechanism thus far described is similar to that of the mechanism disclosed in Patent No. 1,953,067, granted April 3, 1934, upon an application filed in the name of M. H. Ballard, to which reference may be had.

I have provided mechanism by which the certainty of having the brake strap 16 tightened about the drum 14 at the proper time is ensured. In effecting this, I provide for adjustment of the rod 24 in a direction to apply a preliminary tension to the strap 16 prior to the application of the full braking force. To this end, the rod 24 carries at one end a cylindrical member 36 which is mounted for sliding movement in ears 32 and 33 carried by a portion of the frame 10. The other end of the rod loosely projects through an elongated slot 34 in the brake lever 18. The cylindrical member 36 has screw threads 37 in engagement with a nut or ratchet wheel 38, positioned between the ears, and having ratchet teeth 39 by which the nut 38 can be rotated in adjusting the rod 24 substantially along a tangent to the brake drum in a direction to tighten the strap 16 about the drum. The rod 24 is held against rotation with the nut 38 by a square shoulder 40 which slidably engages the upper surface of a lug 41 on the machine frame. The nut 38 can be rotated by a pawl 42 pivoted on a pin 44 carried by a lever 46 loosely mounted on the member 36. The pawl is maintained in engagement with the teeth 39 of the nut by a spring 48 carried by a projection 50 on the lever 46. The ear 32 carries a dog 52 arranged to be forced into engagement with the ratchet teeth 39 by a spring 54 to prevent rotation of the nut 38 in a reverse direction.

The ratchet wheel or nut 38 is operated by means of a push rod 56 connected to the pin 44 and arranged to be moved up and down by a lever 58 pivotally mounted on a shaft 60 at the upper portion of the frame. The push rod 56 extends upwardly through a flanged sleeve 62 slidably mounted in a pin 64 on the end of the lever 58. The sleeve 62 bears against a spring 66 surrounding the push rod and operates, when the lever 58 is moved downwardly, yieldingly to move the rod downwardly to cause the pawl 42 to exert a rotative force on the nut 38. The tension of the spring 66 can be adjusted by the nut 68 threaded upon the sleeve 62 and bearing upon the upper surface of the lever 58, the adjustment being maintained by a lock nut 69. The upper end of the rod 56 carries a nut 70 arranged to be engaged by the upper end of the sleeve 62 to force the rod upwardly upon upward movement of the lever 58. The lever 58 is connected to the brake lever 18 by means of a pin 72 with the result that the rod 56 and, consequently, the pawl 42, are moved up and down in timed relation to the movements of the brake lever 18.

In the operation of the brake, as the brake lever 18 starts to move downwardly to tighten the brake strap 16 about the drum 14, the lever 58 is operated to compress the spring 66, thereby exerting force on the pawl 42 and tending to rotate the nut 38 to effect movement of the rod 24 in a direction to exert a preliminary tension on the brake strap 16. As long as the brake strap is sufficiently taut about the drum, the pressure applied to the pawl will not effect rotation of the nut 38, but as the strap wears upon successive applications of the brake, the pawl 42 will be effective to cause rotation of the nut 38 to move the rod 24 to take up any slack which may have occurred.

The operation of the lever 58 is such that the spring 66, through the rod 24, will initiate the preliminary tensioning of the brake strap 16 at some time before, conveniently about 90° before, the shaft is to be stopped. Preferably the anchor end of the strap is adjusted into position such that the strap will be effective to stop the shaft in predetermined position upoon tightening of the slack end of the strap by the brake lever 18. The tension of the spring 66 is adjusted by means of the nut 70 so that, with the strap in the position mentioned, the rod 24 will be forced to the right (Fig. 1) under pressure somewhat greater than that exerted by the spring 66, movement of the rod being prevented by the pawl 52. When the brake strap becomes worn or stretched, the preliminary tension applied during a braking operation will be less than the force exerted by the spring 66 and the latter, acting through the pawl 42 and nut 38, will cause movement of the rod 24 to the left (Fig. 1) to take up the slack in the strap.

Having described my invention, what I claim as new and desire to secure by Letters Patent of the United States is:

1. Braking mechanism comprising a shaft, a brake drum on the shaft, a brake lever, a brake band extending around the drum and having one end thereof operatively connected to the brake lever, means for anchoring the other end of the brake band, and means operable in timed relation to an operation of the lever at a predetermined point in the cycle of operations for applying force to the anchoring means in a direction to maintain an optimum tension in the brake band.

2. Braking mechanism comprising a shaft, a brake drum carried by the shaft, a brake band extending about the drum and having a normally slack end portion, a lever connected to the slack end portion of the brake band for tightening the band about the drum to arrest movement of the shaft, anchoring means secured to the other end of the brake band, means for mounting the anchoring means for movement in a direction to increase the tension of the brake band, and means operable in timed relation to an operation of the lever for applying force to the anchoring means to effect movement of the anchoring means when slack occurs in the brake band.

3. Braking mechanism comprising a shaft, a brake drum carried by the shaft, a brake band extending about the drum, an operating lever connected to one end portion of the band, anchoring means secured to the other end of the brake band, means for mounting the anchoring means for movement tangentially of the drum, and yielding means operable during each rotation of the shaft tending to move the anchoring means in a direction to tighten the brake band about the drum.

4. Braking mechanism comprising a shaft, a brake drum carried by the shaft, a brake band extending about the drum, a brake lever connected to one end of the brake band, anchoring means connected to the other end of the brake band, yielding means operable during each cycle of operations of the mechanism for exerting force to move the anchoring means in a direction to take up slack in the band when the tension in the band falls below a predetermined amount at a predetermined point in the cycle.

5. Braking mechanism comprising a shaft, a brake drum carried by the shaft, a brake band extending about the drum, a brake lever connected to one end of the band, anchoring means connected to the other end of the band, ratchet mechanism for moving the anchoring means in a direction to increase the tension on the band, yielding means for actuating the ratchet mechanism, and means operatively connecting the brake lever and the ratchet mechanism actuating means for effecting operation of the ratchet mechanism to move the anchoring means at a predetermined point in the cycle of operations when the tension upon the band is less than the force exerted upon the anchoring means by the ratchet mechanism.

6. Braking mechanism comprising a shaft, a drum on the shaft, a brake band extending about the drum, a brake lever secured to one end of the band, a rod slidably mounted in the frame of the machine and having one end thereof connected to the other end of the brake band, a ratchet wheel threaded on the rod, a lever operatively connected to the brake lever, a push rod slidably mounted upon the lever, a pawl carried by the push rod, a spring carried by the rod and arranged to be engaged by the lever yieldingly to force the pawl against the ratchet wheel to rotate the same in a direction to cause the rod to increase the tension upon the brake band, and a second pawl arranged to engage the ratchet wheel to prevent its rotation in the reverse direction.

FRANCIS J. BETTER.